US008699341B2

(12) United States Patent
Likar et al.

(10) Patent No.: US 8,699,341 B2
(45) Date of Patent: *Apr. 15, 2014

(54) METHOD FOR CONGESTION AVOIDANCE IN 4G NETWORKS

(71) Applicant: Accelera Mobile Broadband, Inc., Santa Clara, CA (US)

(72) Inventors: Bojan Likar, Cupertino, CA (US); Robert Posel, Ljubljana (SI); Andreas Kalagasidis, Ljubljana (SI); Janez Bester, Zg.Besnica (SI); Andrej Kos, Blejska Dobr (SI); Mojca Volk, Bled (SI); Urban Sedlar, Bohinjska Bistrica (SI); Luka Mali, Novomesto (SI); Janez Sterle, Ljublja (SI)

(73) Assignee: Accelera Mobile Broadband, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/914,941

(22) Filed: Jun. 11, 2013

(65) Prior Publication Data
US 2013/0343189 A1 Dec. 26, 2013

Related U.S. Application Data

(63) Continuation of application No. 12/882,333, filed on Sep. 15, 2010, now Pat. No. 8,483,059.

(51) Int. Cl.
*H04W 28/00* (2009.01)
*H04W 24/02* (2009.01)

(52) U.S. Cl.
USPC ......... 370/232; 370/236; 370/254; 455/432.1

(58) Field of Classification Search
USPC ......... 370/229, 231, 232, 233, 234, 235, 236, 370/237, 254; 455/422.1, 423, 432.1, 436, 455/443, 445, 450, 451, 452.1, 452.2
See application file for complete search history.

(56) References Cited

U.S. PATENT DOCUMENTS

| 6,141,565 | A  | * | 10/2000 | Feuerstein et al. | 455/560 |
|---|---|---|---|---|---|
| 6,415,147 | B2 | * | 7/2002 | Hayashi et al. | 455/433 |
| 6,738,350 | B1 | * | 5/2004 | Gao et al. | 370/232 |
| 7,962,146 | B2 | * | 6/2011 | Ludwig et al. | 455/450 |
| 8,005,037 | B2 | * | 8/2011 | Ishii et al. | 370/328 |
| 8,085,709 | B2 | * | 12/2011 | Franceschini et al. | 370/328 |
| 8,213,454 | B2 | * | 7/2012 | Insler et al. | 370/445 |

(Continued)

*Primary Examiner* — Ahmed Elallam
(74) *Attorney, Agent, or Firm* — Van Pelt, Yi & James LLP

(57) ABSTRACT

This invention aims to avoid and resolve congestions in wireless 4G networks. The method is based on a central self-organizing network (SON) server, which dynamically changes neighbor lists on congested base station and on all base stations in vicinity. The procedure is triggered by measuring relative committed traffic rate and air interface utilization of the base station. When base station enters into congested state, it notifies the SON server. The SON server creates new neighbor lists for all base stations in the vicinity and removes the congested base station from these lists. With new neighbor lists propagated to mobile stations, the latter won't scan and initiate handovers to the congested base station. The SON server additionally creates a new dense neighbor list and changes handover triggers settings of the congested base station. The mobile stations consequently find other handover opportunities and connect to different base stations. As the air interface resources are released, the base station leaves the congested state.

20 Claims, 5 Drawing Sheets

(56) References Cited

U.S. PATENT DOCUMENTS

| | | | |
|---|---|---|---|
| 8,260,357 B2* | 9/2012 | Likar et al. | 455/561 |
| 8,369,271 B2* | 2/2013 | Borst et al. | 370/329 |
| 8,374,083 B2* | 2/2013 | Shi et al. | 370/230 |
| 8,483,059 B2* | 7/2013 | Likar et al. | 370/232 |
| 8,498,207 B2* | 7/2013 | Trigui et al. | 370/235 |
| 8,605,592 B2* | 12/2013 | Nadas et al. | 370/235 |
| 2003/0035385 A1* | 2/2003 | Walsh et al. | 370/316 |
| 2007/0293235 A1* | 12/2007 | Inayoshi et al. | 455/455 |
| 2008/0130505 A1* | 6/2008 | Yoshimura et al. | 370/236 |
| 2009/0201810 A1* | 8/2009 | Kazmi et al. | 370/232 |
| 2009/0275343 A1* | 11/2009 | Monnes et al. | 455/453 |
| 2010/0002579 A1* | 1/2010 | Shi et al. | 370/229 |
| 2010/0216403 A1* | 8/2010 | Harrang | 455/41.3 |
| 2011/0093913 A1* | 4/2011 | Wohlert et al. | 726/1 |
| 2012/0026883 A1* | 2/2012 | Chu et al. | 370/235 |

* cited by examiner

METHOD FOR CONGESTION AVOIDANCE IN 4G NETWORKS

CROSS REFERENCE TO OTHER APPLICATIONS

This application is a continuation of co-pending U.S. patent application Ser. No. 12/882,333, entitled METHOD FOR CONGESTION AVOIDANCE IN 4G NETWORKS filed Sep. 15, 2010 which is incorporated herein by reference for all purposes.

FIELD OF THE INVENTION

The present invention refers to a method for congestion avoidance in 4G networks.

BACKGROUND OF THE INVENTION

In a wireless network, the quality of the service is an important factor of user satisfaction. Due to the limited nature of the wireless spectrum, it is necessary to increase base station density in order to increase net throughput per user. In such an environment, automatic traffic congestion and avoidance and the self-healing nature of the wireless network become increasingly important.

Many techniques exist for avoiding interference on a single wireless link by preventing that different mobile terminals corrupt each other's transmitted signal by transmitting at the same time (TDMA, FDMA, CDMA, OFDMA, CSMA). In addition, directed links can be utilized, preventing the mobile stations from causing mutual interference.

However, these techniques lose their effectiveness if the number of mobile stations that wish to speak to the same base station at the same time increases over a certain threshold. Thus, to assure a satisfactory level of Quality of Service, the network is divided into geographically separate segments or cells, each being served by its own base station, which serve geographically localized mobile stations only.

To maximize net throughput per user, an operator must utilize a larger number of smaller cells, each serving a smaller number of mobile stations with higher net throughput per user. For that reason, the segments of 4G networks are much smaller than cells in traditional cellular networks and are consequently termed pico cells. Each pico cell is served by a pico base station.

In a network, covered by a high number of densely distributed base stations with partially or completely overlapping cells, it is crucial to automate the network operation and management. An important aspect of network management is congestion avoidance, which assures that no single base station is overloaded if there is available transmission capacity available that could be used to offload the congested base station. However, such high density of 4G networks at the same time increases the amount of handover events, where mobile station switches from one base station to the next.

The present invention describes a method for measuring relative committed traffic rate and air interface utilization, and on the basis of thus obtained results manages the base station neighbor lists, which are used by mobile terminals for base station selection.

Other similar inventions exist, such as US2007/0293235.

DETAILED DESCRIPTION OF THE INVENTION

Figure 1:
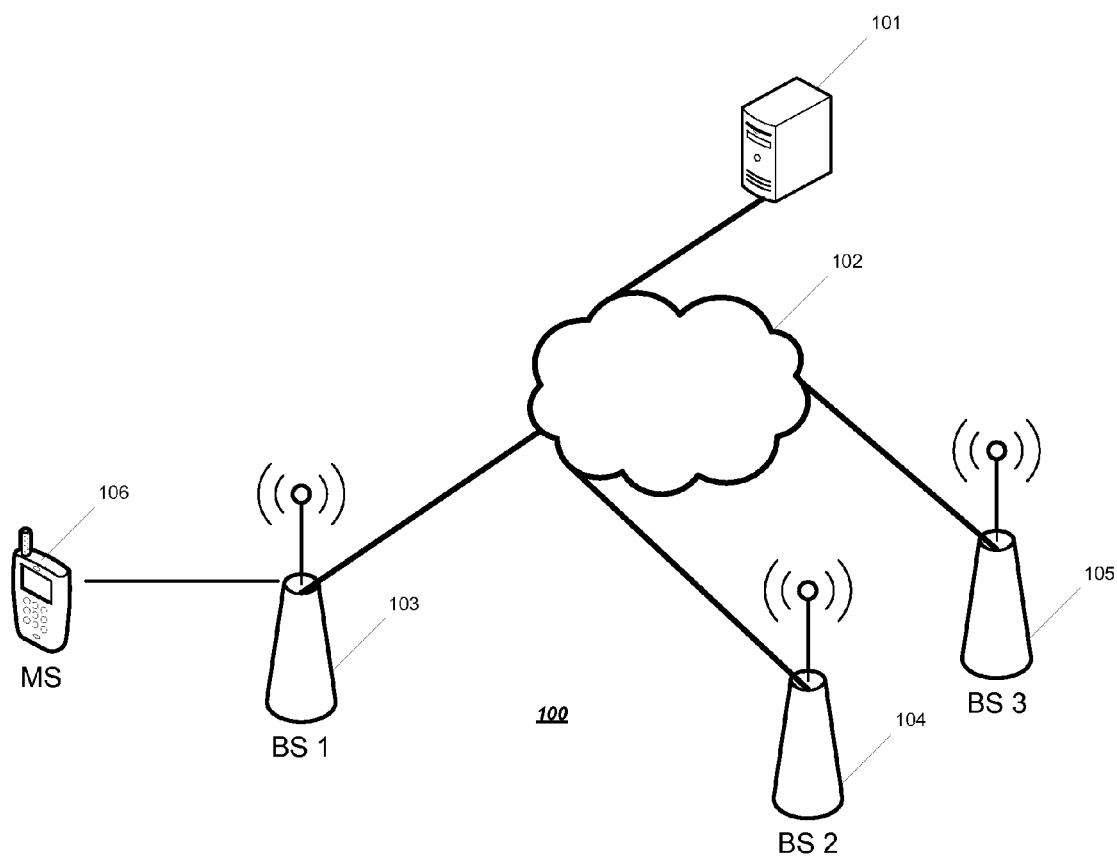
FIG. 1 shows a generalized 4G mobile network.
Figure 2:
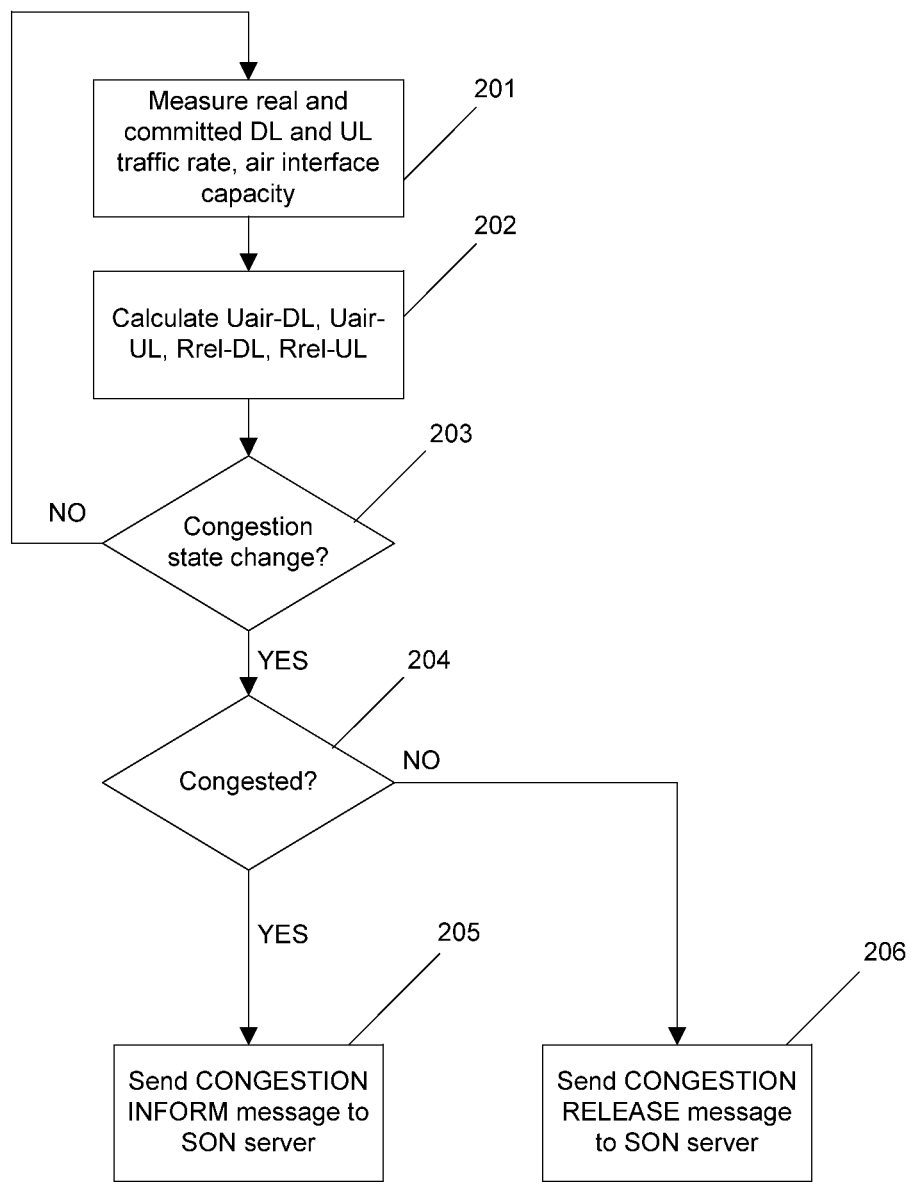
FIG. 2 shows a flow chart of the decision process regarding the congestion state of a BS, which takes place in the BS.
Figure 3:
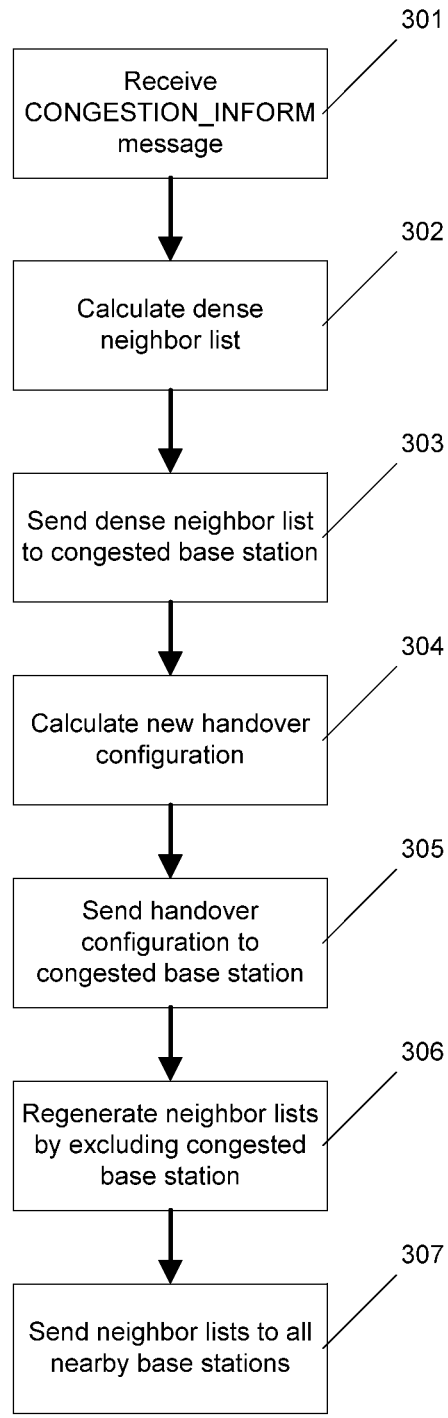
FIG. 3 shows a flow chart of the process taking place in the SON server upon receiving the notification of congestion from the BS.
Figure 4:
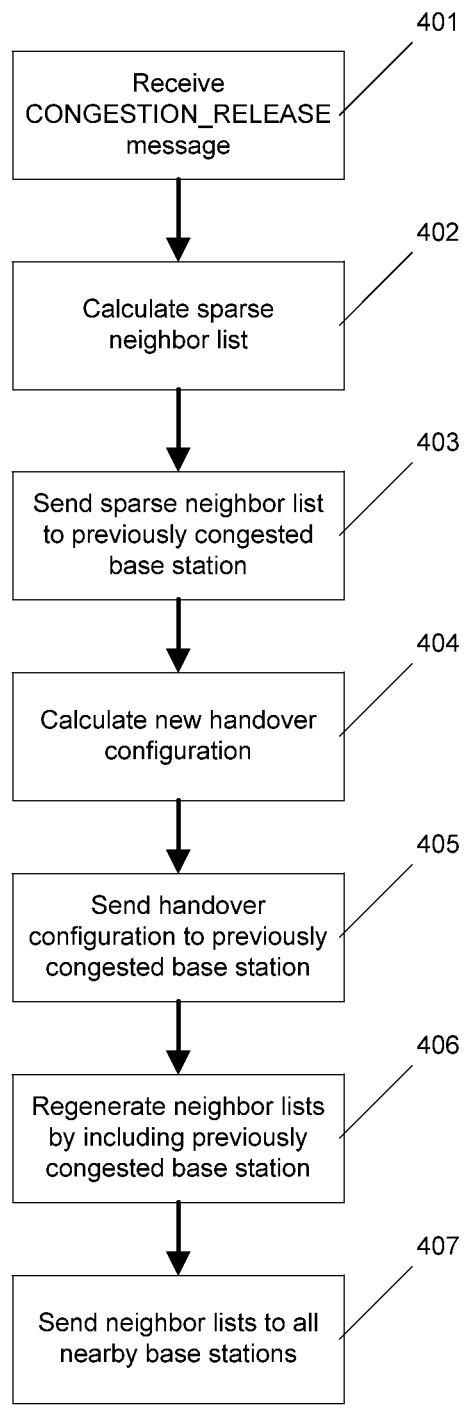
FIG. 4 shows a flow chart of the process taking place in the SON server upon receiving the notification of released congestion from the BS.
Figure 5:
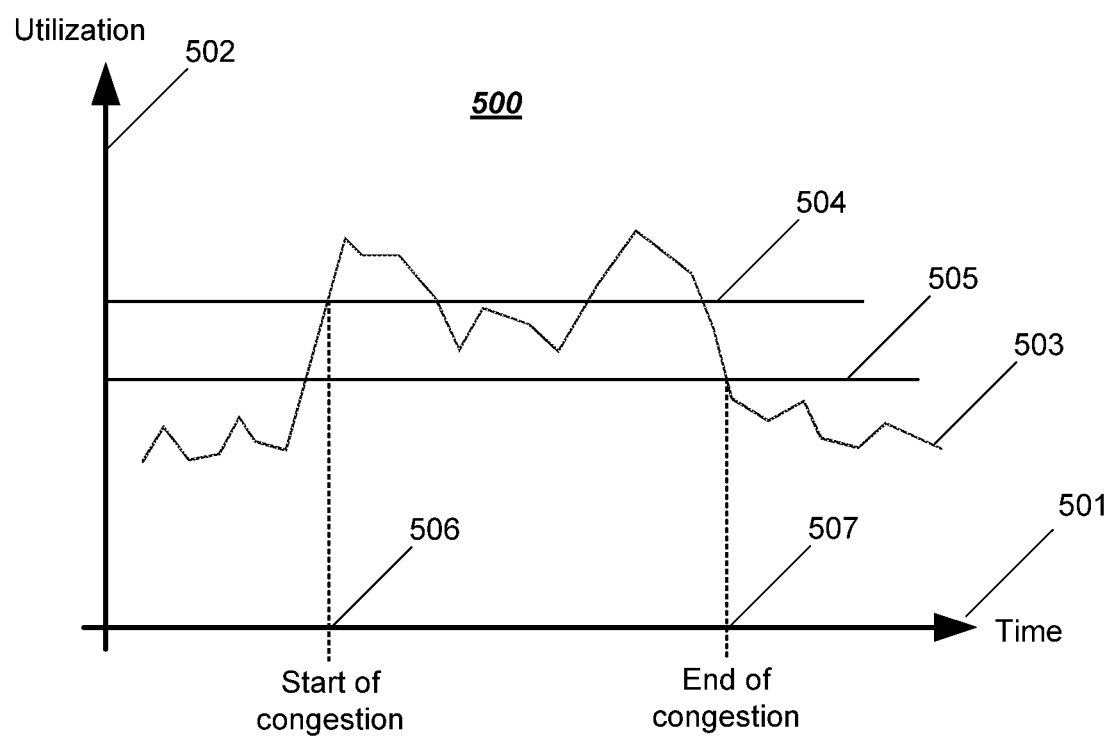
FIG. 5 shows a graph of a utilization metric, which shows the role of the hysteresis in determining the congestion state of the BS.

As mentioned above, FIG. 1 shows a generalized 4G mobile network, in particular a wireless system (100) comprising a self-organizing network (SON) server (101), self-organizing network (SON) agent, located on a base station (BS) (103), Neighboring base stations (104, 105) and mobile stations (MS) (106). The mobile stations connect to the base stations as a part of the normal operation routine. When so many mobile stations connect to a single BS that it prevents normal functioning of the BS, congestion occurs.

The method of congestion avoidance comprises the steps of congestion detection and congestion avoidance measures.

In the process of detecting congestion, a number of parameters are measured (201) by the base station. The parameters are:

Downlink air interface capacity at time t (Cair_DL), which is calculated from downlink air quality of all modems, priority and service type of all traffic flows.

Uplink air interface capacity at time t (Cair_UL), which is calculated from uplink air quality of all modems, priority and service type of all traffic flows.

Downlink air traffic rate Tair_DL at time t.

Uplink air traffic rate Tair_UL at time t.

Downlink committed air traffic rate Rc_DL at time t.

Uplink committed air traffic rate Rc_UL at time t.

On the basis of measured parameters, four indicators are calculated (202):

Downlink air interface utilization Uair_DL, which is obtained by performing a moving average calculation for Tair_DL and dividing the result by Cair_DL.

Uplink air interface utilization Uair_UL, which is obtained by performing a moving average calculation for Tair_UL and dividing the result by Cair_UL.

Relative committed downlink traffic rate (Rrel_DL), which is obtained by dividing the Rc_DL by Cair_DL.

Relative committed uplink traffic rate (Rrel_UL), which is obtained by dividing the Rc_UL by Cair_UL.

Following the described calculations, a decision is made about the state of the base station (203, 204). Preconfigured thresholds Downlink air interface utilization threshold, Uplink air interface utilization threshold, Downlink air interface utilization hysteresis and Uplink air interface utilization hysteresis are utilized in deciding the state of the congestion. The base station enters in a congested state as soon as any of the described indicators Uair_DL, Uair_UL, Rc_DL and Rc_UL crosses the respective preconfigured threshold (500). The procedure is described in more detail below. When Downlink air interface utilization (Uair_DL) (503) crosses the Downlink Air interface utilization threshold (504), the base station enters into congested state (506). In the same manner, the base station enters into congested state when Uplink air interface utilization (Uair_UL) crosses the Downlink Air interface utilization threshold, OR when Relative committed downlink traffic rate (Rrel_DL) crosses the Downlink Air interface utilization threshold, OR when Relative committed uplink traffic rate (Rrel_UL) crosses the Uplink Air interface utilization threshold.

When the base station (103) enters the congested state (506), it informs the self-organizing network (SON) server of congestion by sending a CONGESTION_INFORM message (205).

The SON server receives the CONGESTION_INFORM message (301), calculates a dense neighbor list (302) and responds to the congested base station by sending the dense neighbor list (303). In the next step, the SON server recalculates handover trigger configuration (304), which promotes handovers from the congested base station to neighboring base stations, and sends it to the congested base station (305). Finally, the SON server updates the neighbor lists by excluding the congested base station (306) and sends them to all neighboring base stations (307). By sending the updated list to neighboring base stations, the list is propagated to mobile stations, which won't scan and initiate handover to the congested base station.

As a consequence of providing a denser neighbor list and removing the congested station from the neighboring stations' lists, the mobile terminals don't initiate handovers to the congested base station, but instead find other handover opportunities. As a result, the congestion gradually clears.

The base station exits the congested state (507) when all four indicators drop below the respective hysteresis thresholds (505), i.e., when the Downlink air interface utilization (Uair_DL) (503) drops below the Downlink Air interface utilization hysteresis AND the Uplink air interface utilization (Uair_UL) drops below the Uplink Air interface utilization hysteresis AND the Relative committed downlink traffic rate (Rrel_DL) drops below the Downlink Air interface utilization hysteresis AND the Relative committed uplink traffic rate (Rrel_UL) drops below the Uplink Air interface utilization threshold.

When the base station exits the congested state, it sends the SON server a CONGESTION_RELEASE message (206). The SON server receives the CONGESTION_RELEASE message (401), generates a sparse neighbor list (402) and sends it to the previously congested base station (403). Next, the SON server calculates new handover triggers (404) and sends them to the previously congested base station (405). Finally, the SON server generates neighbor lists for the neighboring base stations and includes the previously congested base station back into the list (406); the SON server sends (407) the generated lists to the neighboring base stations (104, 105).

The invention claimed is:

1. A method for detecting congestion in cellular networks, comprising:
    measuring an uplink parameter estimating a ratio of uplink utilization and uplink capacity;
    measuring a downlink parameter estimating a ratio of downlink utilization and downlink capacity; and
    detecting congestion by a processor using a pair of uplink hysteresis thresholds and a pair of downlink hysteresis thresholds.

2. The method of claim 1, wherein measuring the uplink parameter comprises performing a moving average calculation for an uplink air traffic rate and dividing the moving average calculation result by an uplink air interface capacity.

3. The method of claim 1, wherein measuring the uplink parameter comprises dividing an uplink committed air traffic rate by an uplink air interface capacity.

4. The method of claim 1, wherein measuring the downlink parameter comprises performing a moving average calculation for a downlink air traffic rate and dividing the moving average calculation result by a downlink air interface capacity.

5. The method of claim 1, wherein measuring the downlink parameter comprises dividing a downlink committed air traffic rate by a downlink air interface capacity.

6. The method of claim 1, wherein detecting congestion comprises:
    detecting whether the uplink parameter crosses above a first of the pair of uplink hysteresis thresholds;
    detecting whether the downlink parameter crosses above a first of the pair of downlink hysteresis thresholds; and
    entering a congested state in response to the detection of the uplink parameter crossing the first of the pair of uplink hysteresis thresholds or the detection of the downlink parameter crossing the first of the pair of downlink hysteresis thresholds.

7. The method of claim 6, wherein detecting congestion comprises:
    detecting whether the uplink parameter crosses below a second of the pair of uplink hysteresis thresholds; and
    detecting whether the downlink parameter crosses below a second of the pair of downlink hysteresis thresholds.

8. The method of claim 7, further comprising:
    measuring a second uplink parameter estimating the ratio of uplink utilization and uplink capacity; and
    measuring a second downlink parameter estimating the ratio of downlink utilization and downlink capacity.

9. The method of claim 8, wherein detecting congestion comprises:
    detecting whether the second uplink parameter crosses above the first of the pair of uplink hysteresis thresholds;
    detecting whether the second downlink parameter crosses above the first of the pair of downlink hysteresis thresholds; and
    entering a congested state in response to the detection of the second uplink parameter crossing the first of the pair of uplink hysteresis thresholds or the detection of the second downlink parameter crossing the first of the pair of downlink hysteresis thresholds.

10. The method of claim 9, wherein detecting congestion comprises:
    detecting whether the second uplink parameter crosses below the second of the pair of uplink hysteresis thresholds;
    detecting whether the second downlink parameter crosses below the second of the pair of downlink hysteresis thresholds; and
    exiting any congested state in response to the detection of the uplink parameter crossing the second of the pair of uplink hysteresis thresholds and the detection of the downlink parameter crossing the second of the pair of downlink hysteresis thresholds and the detection of the second uplink parameter crossing the second of the pair of uplink hysteresis thresholds and the detection of the second downlink parameter crossing the second of the pair of downlink hysteresis thresholds.

11. A system for detecting congestion in cellular networks, comprising:
  a processor; and
  a memory coupled with the processor, wherein the memory is configured to provide the processor with instructions which when executed caused the processor to:
    measure an uplink parameter estimating a ratio of uplink utilization and uplink capacity;
    measure a downlink parameter estimating a ratio of downlink utilization and downlink capacity; and
    detect congestion using a pair of uplink hysteresis thresholds and a pair of downlink hysteresis thresholds.

12. The system of claim 11, wherein measuring the uplink parameter comprises performing a moving average calculation for an uplink air traffic rate and dividing the moving average calculation result by an uplink air interface capacity.

13. The system of claim 11, wherein measuring the uplink parameter comprises dividing an uplink committed air traffic rate by an uplink air interface capacity.

14. The system of claim 11, wherein measuring the downlink parameter comprises performing a moving average calculation for a downlink air traffic rate and dividing the moving average calculation result by a downlink air interface capacity.

15. The system of claim 11, wherein measuring the downlink parameter comprises dividing a downlink committed air traffic rate by a downlink air interface capacity.

16. The system of claim 11, wherein detecting congestion comprises:
  detecting whether the uplink parameter crosses above a first of the pair of uplink hysteresis thresholds;
  detecting whether the downlink parameter crosses above a first of the pair of downlink hysteresis thresholds; and
  entering a congested state in response to the detection of the uplink parameter crossing the first of the pair of uplink hysteresis thresholds or the detection of the downlink parameter crossing the first of the pair of downlink hysteresis thresholds.

17. The system of claim 16, wherein detecting congestion comprises:
  detecting whether the uplink parameter crosses below a second of the pair of uplink hysteresis thresholds; and
  detecting whether the downlink parameter crosses below a second of the pair of downlink hysteresis thresholds.

18. The system of claim 17, further comprising:
  measuring a second uplink parameter estimating the ratio of uplink utilization and uplink capacity; and
  measuring a second downlink parameter estimating the ratio of downlink utilization and downlink capacity.

19. The system of claim 18, wherein detecting congestion comprises:
  detecting whether the second uplink parameter crosses above the first of the pair of uplink hysteresis thresholds;
  detecting whether the second downlink parameter crosses above the first of the pair of downlink hysteresis thresholds; and
  entering a congested state in response to the detection of the second uplink parameter crossing the first of the pair of uplink hysteresis thresholds or the detection of the second downlink parameter crossing the first of the pair of downlink hysteresis thresholds.

20. The system of claim 19, wherein detecting congestion comprises:
  detecting whether the second uplink parameter crosses below the second of the pair of uplink hysteresis thresholds;
  detecting whether the second downlink parameter crosses below the second of the pair of downlink hysteresis thresholds; and
  exiting any congested state in response to the detection of the uplink parameter crossing the second of the pair of uplink hysteresis thresholds and the detection of the downlink parameter crossing the second of the pair of downlink hysteresis thresholds and the detection of the second uplink parameter crossing the second of the pair of uplink hysteresis thresholds and the detection of the second downlink parameter crossing the second of the pair of downlink hysteresis thresholds.

* * * * *